Figure 1:
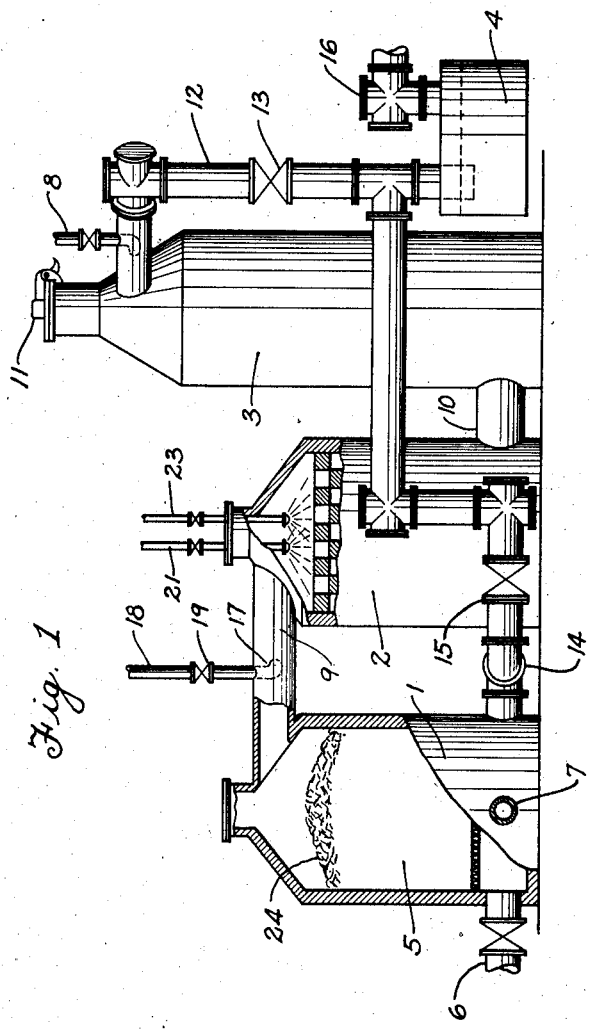

March 27, 1945.  E. L. HALL  2,372,197
PRODUCTION OF VALUABLE HYDROCARBONS
Filed Feb. 19, 1938  3 Sheets-Sheet 1

Edwin L Hall
INVENTOR
BY Hugo G Kemman
ATTORNEY

March 27, 1945.　　　　　E. L. HALL　　　　　2,372,197
PRODUCTION OF VALUABLE HYDROCARBONS
Filed Feb. 19, 1938　　　3 Sheets-Sheet 2

Edwin L. Hall
INVENTOR
BY Hugo G. Kenman
ATTORNEY

March 27, 1945.  E. L. HALL  2,372,197
PRODUCTION OF VALUABLE HYDROCARBONS
Filed Feb. 19, 1938  3 Sheets-Sheet 3

INVENTOR.
Edwin L. Hall
BY Hugo G. Kenman
ATTORNEY.

Patented Mar. 27, 1945

2,372,197

UNITED STATES PATENT OFFICE 2,372,197

PRODUCTION OF VALUABLE HYDROCARBONS

Edwin L. Hall, Philadelphia, Pa., assignor to The United Gas Improvement Company, a corporation of Pennsylvania Application February 19, 1938, Serial No. 191,441

9 Claims. (Cl. 196—63)

This invention pertains generally to the simultaneous production of manufactured gas and valuable hydrocarbons, and pertains particularly to a method for increasing the yields of desirable hydrocarbons.

For convenience, the invention will be described in connection with the manufacture of carburetted water gas, but it is to be understood that it may have other applications.

A step in the manufacture of carburetted water gas involves the cracking of petroleum oil to form hydrogen and hydrocarbon gases for mixture with the ordinary blue gas produced by passing steam through the fuel bed.

While in normal practice by far the larger part of the petroleum oil, which customarily comprises the less costly fractions of the crude such as gas oil or heavy residuums, finds its way into fixed gas or in other words into gases which are liquefied with difficulty, such as hydrogen methane, ethylene, and possibly other gaseous paraffins and olefins, there is nevertheless a certain portion of the oil used up in the production of water gas tar, drip oil, and lower temperature hydrocarbon condensates, the quantity of the latter recovered depending upon the final temperature to which the gas is reduced before delivery to a gas holder for distribution.

The tar, drip oil and lower temperature condensates contain a wide variety of hydrocarbons, the number and quantity of which vary with the final temperature to which the gas is subjected.

As an example, saturated and unsaturated hydrocarbons such as benzene, toluene, xylene, naphthalene, anthracene, indene, styrene, methyl styrene, cyclopentadiene, isoprene, piperylene, butadiene, etc., might be detected in small quantities or recovered in substantial amounts. All of the hydrocarbons mentioned are valuable, the unsaturated compounds perhaps more so than the others because under normal operating conditions small quantities only are produced.

The unsaturated hydrocarbons are coming more and more into industrial demand, but their wide use is handicapped by limited sources of supply.

In accordance with my invention a larger proportion of the petroleum oil finds its way into the more valuable hydrocarbons and particularly into those of unsaturated molecular structure.

Figure 2:
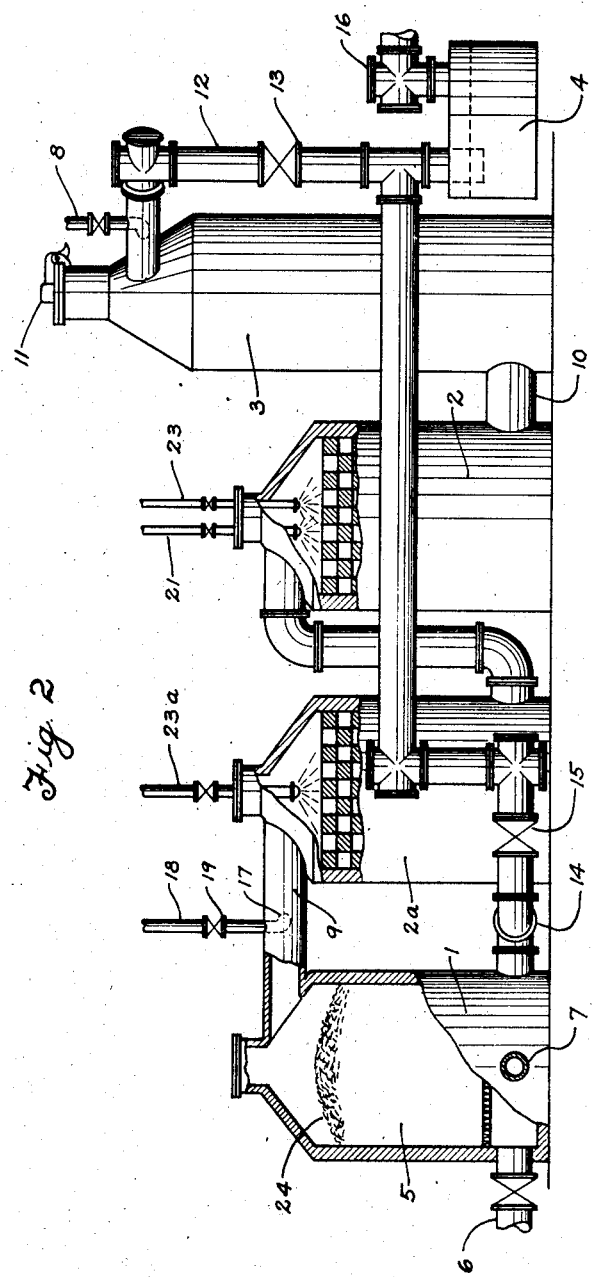
Figure 3:
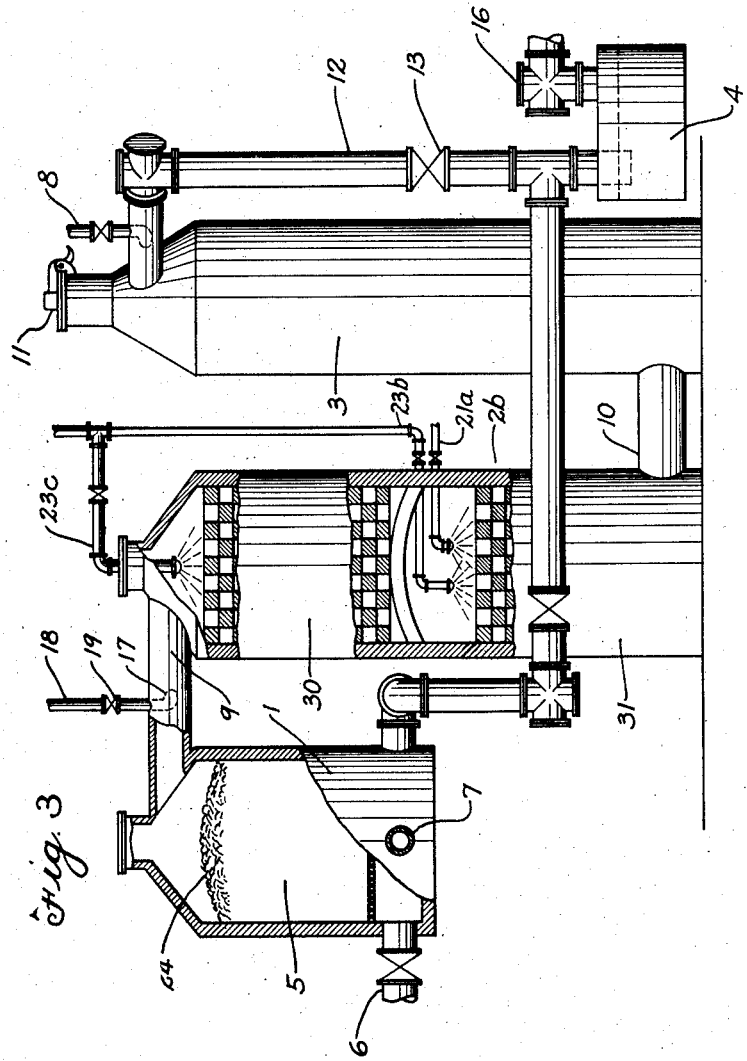

Other features of the invention reside in the steps, combination of steps, and sequences of steps, and in the construction, combination and arrangement of parts, all of which together with other features will become more apparent to persons skilled in the art as the specification proceeds and upon reference to the drawings in which;

Figure 1 is an elevation, partly in section, illustrating a conventional 3 shell water gas set; and Figures 2 and 3 are elevations, partly in section, illustrating modifications.

Referring more particularly to the drawings, 1 indicates a generator, 2 a carburetter, 3 a superheater and 4 a wash box.

Generator 1 is illustrated as having a fuel bed 5, an up run air blast supply 6, and an up run steam supply 7.

Superheater 3 is shown with a down run steam supply 8.

Generator 1 is provided at its top with an off-take 9 leading to the top of the carburetter 2, and carburetter 2 is provided at its base with an off-take 10, leading to the base of the superheater 3.

Superheater 3 is shown with a stack valve 11 and a gas off-take 12, the latter leading to wash box 4 through valve 13.

Generator 1 has a gas off-take 14 at its base provided with valve 15. Gas off-take 14 leads to wash box 4.

Wash box 4 is shown with the conventional gas off-take 16.

The apparatus so far particularly described is entirely conventional in character. Any other gas making equipment employing a run with oil might have been substituted for the purposes of describing the invention.

The operation of the apparatus will be described with a conventional cycle.

The fuel bed 5 is blasted with air supplied at 6. This raises the temperature of the fuel bed and generates producer gas which is burned as it flows through the set by secondary air introduced at 17 through pipe 18 controlled by valve 19.

The hot blast gases pass down through the carburetter 2 and up through superheater 3 raising the temperature of the carburetter and superheater and storing heat therein, and finally escape through stack valve 11.

The following table will illustrate the swing in temperature at various points in the set during the blast.

Table 1

| Point in set | Temperature, °F., start of blast | Temperature, °F., end of blast |
|---|---|---|
| Carburetter top | 1,250 to 1,350 | 1,600 to 2,000 |
| Carburetter middle | 1,275 to 1,375 | 1,500 to 1,700 |
| Superheater base (also carburetter base) | 1,300 to 1,400 | 1,325 to 1,425 |
| Superheater middle | 1,325 to 1,375 | 1,335 to 1,385 |
| Superheater top | 1,275 to 1,325 | 1,275 to 1,325 |

After the air blasting operation the set is purged of blast gases by steam admitted at 7, whereupon stack valve 11 is closed, valve 13 is opened and an uprun is made with steam supplied at the same point. The blue water gas thus made passes through carburetter 2, superheater 3, wash box 4, and flows out through off-take 16.

During this up run with steam, oil is introduced into the set for cracking and fixing in the carburetter and superheater.

Although the point of introduction of oil may vary in different gas making equipment, for convenience in description I have illustrated an oil spray 21 at the top of carburetter 2.

Irrespective of the construction of the inside of the carburetter, which may vary widely in different types of apparatus, it is customary to have a substantial part of this oil come directly into contact with the heated surfaces, whether they be of checkerbrick, or of other construction or comprise merely the side walls. However, whether coming into contact with the heated surfaces or not this oil is subjected to the temperatures of the carburetter and superheater as it is carried along by the stream of blue water gas, and is cracked into gas, coke, tar, drip oil and other condensates. The coke is usually deposited in the carburetter and superheater and the condensates are usually carried out of the superheater and are condensed at the wash box and further on in other condensing equipment.

After the uprun, valve 13 is closed, valve 15 opened and steam is reversed through the set by admitting it at 8. This steam is superheated in the superheater and carburetter and is passed down through the fuel bed generating water gas which passes through offtake 14 directly to the wash box 4.

To complete the cycle the reverse run with steam is followed by an up run purge with steam.

It is, of course, understood that any other cycle might be substituted.

It will be noted in Table 1 that the highest temperatures in the set excluding the fuel bed are at the top of the carburetter at the end of the blasting run, or in other words at the start of the up run with steam and the spraying of oil. As a result, the oil first entering the set during any cycle is subjected to extremely high temperatures and it is my observation that it is largely cracked to hydrogen and carbon with the possible production of some lower molecular weight hydrocarbons such as methane, ethylene, etc. but to the almost total exclusion of the more valuable higher molecular weight hydrocarbons such as those set forth above. This condition exists chiefly during the time that the temperature at the top of the carburetter is dropping down to say 1800° F. and probably continues to some extent below this point.

It is difficult to avoid the building up of high temperatures at the top of the carburetter during the blasting run since it is necessary to maintain satisfactory high temperatures throughout the rest of the set to properly fix the gas produced.

I have discovered that the yield of the more valuable hydrocarbons may be substantially increased by injecting into the top of the carburetter, after the blast run and before the steam up run, a fluid capable of absorbing large quantities of heat. Such fluid might be water, steam, air or other suitable substance.

For this purpose I have illustrated a second spray at 23. The heat absorbing fluid may be projected directly upon the highly heated refractory surfaces at the top of the carburetter and until the desired temperature is obtained.

It is found that the cooling effect thus obtained may be confined largely to the upper portion of the carburetter, which is a very desirable result.

The following table will illustrated how the temperatures at the top and middle of the carburetter may be reduced without substantially affecting the temperatures at other points throughout the set.

Table 2

| Point in set | Temperature, °F., end of blast | Temperature, °F., after quenching |
| --- | --- | --- |
| Carburetter top | 1,600 to 2,000 | 1,400 to 1,800 |
| Carburetter middle | 1,500 to 1,700 | 1,400 to 1,600 |
| Superheater base (also carburetter base) | 1,325 to 1,425 | 1,325 to 1,425 |
| Superheater middle | 1,335 to 1,385 | 1,335 to 1,385 |
| Superheater top | 1,275 to 1,325 | 1,275 to 1,325 |

The extent of the cooling obtained at the top and middle of the carburetter will of course be determined by the amount of cooling fluid employed. The longer the spray of cooling fluid is continued the more cooling will be obtained.

I find that when peak temperatures at the top of the carburetter, or broadly speaking, at any point or points in the path of the oil or its pyrolytic decomposition products, are removed prior to the introduction of the oil the yield of more valuable hydrocarbons and particularly the yield of valuable unsaturated hydrocarbons is very materially increased.

Although it is convenient to describe the invention in connection with a conventional water gas set, it is to be understood that this is not by way of limitation, and that the invention may be applied to the cracking of petroleum oil in general, and particularly when practiced at pressures at or near atmospheric in apparatus of the character of gas making equipment.

For instance, any means of heating the carburetter may be substituted for the fuel bed 5, such as an oil burner, a tar burner, or even a gas burner. An up blast might be used to carry this heat over into the carburetter and superheater much the same as is done when a fuel bed is used, except that secondary air might or might not be employed.

Since there would be no, or at least very little, carbon to be reacted with steam to form carbon monoxide and hydrogen in the generator, or in other words ordinary blue water gas, the blue gas runs with steam uprun and back run would be omitted, and only a small amount of steam might be employed sufficient to react with the carbon deposited in the carburetter and superheater as a result of cracking the oil, and to purge oil vapors from the set. However, I have discovered that better results may be obtained at low cracking pressures and I propose to use sufficient steam during the oil cracking to considerably reduce the partial pressure of the oil vapors, or in other words to crack the oil at a partial pressure of the magnitude of carburetted water gas conditions.

On the other hand the blue gas runs with steam may also be omitted when a fuel bed is used for blasting, if desired.

It is to be understood that should the blast gases be introduced into the carburetter at any other point so as to locate peak temperatures at some point other than at the top, the point of introduction of cooling medium might be changed to more readily adapt the cooling medium to remove peak temperatures regardless of where occurring. In fact should the equipment be designed and operated so as to cause peak temperatures at more than one point, any or all of such points might be cooled before the oil cracking run for the purposes set forth herein.

Accordingly it will be seen that the oil, cooling medium, and/or blast gases might be introduced at any other point or points, and/or in any other manner.

A set of a somewhat different construction is illustrated in Figure 2 wherein the set of Figure 1 is substantially duplicated in all respects except that a second carburetter 2a is connected in series between carburetter 2 and generator 1.

Carburetter 2a is shown with a spray inlet 23a at its top, this spray inlet being similar to the spray inlet 23 at the top of the carburetter 2.

The arrangement shown in Figure 3 is in effect the same as that of Figure 2, the difference being that a long carburetter 2b is substituted for carburetters 2 and 2a. Carburetter 2b is in many respects the equivalent of joining carburetters 2 and 2a by placing one on top of the other. In other words, a carburetter having an intermediate point for the injection of oil is in many respects similar to two superimposed carburetters or two carburetters connected in series.

Carburetter 2b has an upper section 30 and a lower section 31. An oil spray 21a is shown at the middle of carburetter 2b, or in other words between sections 30 and 31. A spray 23b for water or steam (or other vapor or gas) is shown at the same point.

Another spray 23c for water or steam (or other vapor or gas) is positioned at the top of carburetter 2b.

It will be noted that spray 23c of Figure 3 corresponds to spray 23a of Figure 2 and that spray 23b of Figure 3 corresponds to spray 23 of Figure 2. Likewise, oil spray 21a of Figure 3 corresponds to oil spray 21 of Figure 2.

The sets of Figures 2 and 3 may be operated during the blast run in any desired manner, for instance, in any of the ways already described or suggested in connection with the description of Figure 1. Heat is thus stored in the carburetter or carburetters and in the superheater of the set under consideration.

At the end of the blast run the temperature at the top of carburetter 2 of Figure 2 or at the middle of carburetter 2b of Figure 3 will correspond more or less to the temperature at the middle of carburetter 2 of Figure 1 after the blast run, that is, it will be in the neighborhood of from 1500° to 1700° F.

If after the blast run the customary blue gas uprun is made with steam with injection of oil through spray 21 of Figure 2 or spray 21a of Figure 3, as the case may be, the steam and its reaction products pass up through generator 1, down through carburetter 2a, or down through section 30 and tend to pick up heat which is carried into the oil cracking zone, that is, into carburetter 2 and superheater 3 of Figure 2 or into section 31 and superheater 3 of Figure 3. This supplies a part of the energy required for vaporizing and cracking the oil and retards downward swing in temperature in the oil cracking zone and particularly at the point of injection of oil.

Since the peak temperatures will be confined to carburetter 2a of Figure 2 or to section 30 of carburetter 2b of Figure 3, the effect of spraying oil at 21 in Figure 2 or at 21a in Figure 3 is in many respects the same as the spraying of oil at 21 in Figure 1 after peak temperatures have been removed.

The forms of the invention shown in Figures 2 and 3 may, of course, be operated with any other cycle or in any other manner, for instance, as suggested above in connection with Figure 1.

As an illustration, to obtain a comparable reduction in partial pressure of the oil vapors when the blue gas run is omitted, I prefer to inject steam or water (or other vapor or gas) at 23a and 23 of Figure 2 or at 23c and 23b of Figure 3. In fact, I may operate at any desired partial pressure in this manner say, for instance, between 3 and 10 pounds per square inch, the same as in Figure 1.

Whatever partial pressure for oil vapors is chosen the volume ratio of steam to oil vapors will usually be maintained more or less constant, for instance, when it is desired to hold the partial pressure of oil vapors at 5 pounds per square inch the volume ratio of steam to oil vapors will be approximately 2 to 1.

This steam will be injected at 23 and 23a of Figure 2 and 23b and 23c of Figure 3.

While any division of the steam between the two points of either set may be made, I find it particularly advantageous immediately after the blast to inject the larger part or all of the steam at 23 or 23b, as the case may be, and then as the temperature falls in the oil vaporizing and cracking zone as the oil run proceeds to gradually increase the proportion of steam injected at 23a or 23c, as the case may be, so that toward the end of the oil run the larger part or all of the steam is injected at 23a or 23c.

When operating in this manner the downward swing in temperature in the oil vaporizing and cracking zone is very materially retarded, a very efficient use of the heat stored in carburetter 2a or section 30 is made, and any disadvantage of injecting the oil at a downstream point is overcome.

When operating in this manner heat stored up in the upstream refractory surfaces is supplied to the oil vaporizing and cracking zone as and when it is most needed.

The volume of steam admitted at any one of the points 23, 23a, 23b and 23c may be regulated by calibrated valves (illustrated diagrammatically) the construction and operation of which are well known in the art. Or, if desired, Venturi meters may be added or substituted. The construction and operation of Venturi meters for steam, water or other fluids are also well known in the art.

It will be seen that a fundamental characteristic of similarity between the forms of the invention of Figures 1, 2 and 3 resides in blasting the set to obtain the desired temperatures at the carburetter middle, superheater base, superheater middle, and superheater top, followed by spraying the oil under temperature conditions adapted to increase the yield of the desired hydrocarbons.

In the form shown in Figure 1 the heat absorbing medium for abstracting heat from the top of the carburetter is introduced prior to the oil which is injected at or near the same point, whereas in the forms shown in Figures 2 and 3 the heat absorbing medium and the oil may be injected simultaneously and at different points, the point of injection of oil being considerably downstream from one point of injection of heat absorbing medium.

On the other hand in the forms shown in Figures 2 and 3 the injection of steam or other fluid medium may precede the introduction of oil and/or continue with it, should this be desired for any reason, for instance, for equalizing temperatures throughout the set.

Thus as an alternative to the removal of peak temperatures in the gas-making portion of the path of stored heat as herein described in connection with Fig. 1 I may avoid the building up of these temperatures in said portion in the first instance as described in connection with Fig. 2 and Fig. 3. I may accomplish this by heating the checkerbrick in said portion by means of a low potential heat source of a temperature below flame temperatures. As a further example I may burn tar or oil in the generator during the blast under conditions such that combustion is completed in the generator and does not extend over into the carburetter. In such case the checkerbrick in said portion are heated solely by high temperature gases. Highly superheated steam might be substituted for this purpose.

The term "peak cracking temperature" as used in the claims is intended to define temperature conditions sufficiently high to crack petroleum oil largely to lower molecular weight materials such as hydrogen, methane, ethylene, propylene and carbon at the expense of higher molecular weight hydrocarbons.

Having described my invention particularly, it will be understood that this is by way of illustration, and that changes, omissions, additions, substitutions, and/or modifications might be made within the scope of the claims without departing from the spirit of the invention which is intended to be limited only as required by the prior art.

I claim:

1. A cyclic process for the production of valuable hydrocarbons in a gas-making set wherein petroleum oil is pyrolyzed in vapor phase in a path of stored heat, comprising heating said path to high temperatures and storing heat therein by the passage therethrough of hot blast gases thus establishing a zone in said path in which the temperature is highest, after said heating but before pyrolyzing said oil considerably cooling said zone, and thereafter pyrolytically decomposing said oil in vapor phase in said path including said zone.

2. A cyclic process for the production of valuable hydrocarbons by the pyrolysis of petroleum oil in vapor phase in a gas-making set which includes in the cycle making a blast run for heating and storing heat in the gas-making path of said set by the passage of hot blast gases therethrough and by the combustion in said path of combustibles in said blast gases thus establishing a zone in said path in which the temperature is of peak cracking temperature, after said heating operation but before pyrolyzing said oil considerably cooling said zone by passing a gaseous cooling medium therethrough sufficient to remove said peak cracking temperature, and thereafter pyrolytically decomposing in said heated path including said zone said oil in vapor phase in the presence of a substantial proportion of a diluent gas.

3. A cyclic process for the production of valuable hydrocarbons in a gas-making set wherein petroleum oil is pyrolyzed in vapor phase in a path of stored heat, comprising heating said path to high temperatures and storing heat therein by the passage therethrough of hot blast gases thus establishing along said path a substantial temperature gradient including peak cracking temperature conditions in the highest temperature portion thereof, after said heating but before pyrolyzing said oil considerably reducing said temperature gradient by cooling said highest temperature portion of said path to below peak cracking temperature conditions, and thereafter introducing in the presence of a substantial proportion of steam said oil into said path for vaporization and pyrolytic decomposition therein.

4. A cyclic process for the production of valuable hydrocarbons in a gas-making set wherein petroleum oil is pyrolyzed in vapor phase in a path of stored heat, comprising heating said path to high temperatures and storing heat therein by the passage therethrough of hot blast gases thus establishing a zone in said path in which the temperature is considerably higher than in other zones of said path and is above 1600° F., after said heating but before pyrolyzing said oil considerably cooling said first mentioned zone, and thereafter pyrolytically decomposing said oil in said path including said zones in vapor phase in the presence of a substantial proportion of steam.

5. A cyclic process for manufacturing gas with the production of valuable hydrocarbons wherein petroleum oil is vaporized and decomposed in a path of stored heat, comprising flowing hot blast gases through said path to heat said path to high temperatures thus storing heat therein in a manner to establish a temperature gradient therethrough, the inlet of said hot blast gases into said path being of peak cracking temperature at the end of said heating, then injecting oil and steam into a zone in said path intermediate the ends thereof in which the temperature conditions at the end of said heating are considerably lower than the temperature conditions of the inlet end of said path and are lower than peak cracking temperature conditions, causing the resulting mixed vapors to flow toward the outlet end of said path, injecting steam into said path during the injection of said oil and first mentioned steam considerably nearer the inlet end of said path than the injection of said oil and said first mentioned steam, and causing said second mentioned steam to flow toward the outlet end of said path to carry heat toward said outlet end.

6. A cyclic process for manufacturing gas with the production of valuable hydrocarbons wherein petroleum oil is vaporized and decomposed in a path of stored heat, comprising flowing hot blast gases through said path to heat said path to high temperatures thus storing heat therein in a manner to establish a temperature gradient from one end of said path to the other, the temperatures at the extreme higher temperature end of said path at the end of said heating being in excess of 1600° F., injecting oil and steam into said path intermediate the ends thereof, causing the resulting mixed vapors to flow toward the lower temperature end of said path, injecting steam into said path during the injection of said oil and first mentioned steam considerably nearer the higher temperature end of said path than the injection of said oil and said first mentioned steam, causing said second mentioned steam to flow toward the lower temperature end of said path to carry heat toward said lower temperature end, and during said oil injection decreasing said first mentioned steam while increasing said second mentioned steam in a manner to hold the rate of injection of total steam at least approximately constant.

7. A cyclic process for manufacturing gas with the production of valuable hydrocarbons wherein petroleum oil is vaporized and decomposed in a path of stored heat, comprising flowing hot blast gases through said path to heat said path to high temperatures thus storing heat therein in a manner to establish a temperature gradient from one end of said path to the other, the temperatures at the extreme higher temperature end of said path at the end of said heating being between 1600° F. and 2000° F., injecting oil and steam into a zone in said path intermediate the ends thereof in which the temperature at the end of said heating is between 1500° F. and 1700° F., causing the resulting mixed vapors to flow toward the lower temperature end of said path, injecting steam into said path during the injection of said oil and first mentioned steam at a point considerably nearer the higher temperature end of said path than the injection of said oil and said first mentioned steam, causing said second mentioned steam to flow toward the lower temperature end of said path and thus carry heat toward said lower temperature end, and during said oil injection decreasing said first mentioned steam while increasing said second mentioned steam in a manner to hold the rate of injection of total steam at least approximately constant.

8. A cyclic process for manufacturing gas with the production of valuable hydrocarbons wherein petroleum oil is vaporized and decomposed in a path of stored heat, comprising flowing hot blast gases through said path to heat said path to high temperatures thus storing heat therein in a manner to establish a temperature gradient therethrough, the inlet of said hot blast gases into said path being of peak cracking temperature at the end of said heating, then injecting oil and steam into said path intermediate the ends thereof, causing the resulting mixed vapors to flow toward the outlet end of said path, injecting steam into said path during the injection of said oil and first mentioned steam considerably nearer the inlet end of said path than the injection of said oil and said first mentioned steam, causing said second mentioned steam to flow toward the outlet end of said path to carry heat toward said outlet end, and during said oil injection decreasing said first mentioned steam while increasing said second mentioned steam.

9. A cyclic process for the production of valuable hydrocarbons in a gas-making set wherein petroleum oil is pyrolyzed in vapor phase in a path of stored heat, comprising heating said path to high temperatures and storing heat therein by the passage therethrough of hot blast gases thus establishing a zone in said path in which the temperature is highest, after said heating but before pyrolyzing said oil considerably cooling said zone, and thereafter pyrolitically decomposing said oil in vapor phase in said path including said zone, said cooling being at least of the order of 200° F.

EDWIN L. HALL.